United States Patent
Schiegg et al.

(10) Patent No.: US 12,213,036 B2
(45) Date of Patent: Jan. 28, 2025

(54) METHODS AND APPARATUSES FOR DETERMINING AND RECEIVING V2X MESSAGES

(71) Applicant: Robert Bosch GmbH, Stuttgart (DE)

(72) Inventors: Florian Alexander Schiegg, Hildesheim (DE); Tobias Frye, Braunschweig (DE); Frank Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 17/522,236

(22) Filed: Nov. 9, 2021

(65) Prior Publication Data

US 2022/0159425 A1 May 19, 2022

(30) Foreign Application Priority Data

Nov. 16, 2020 (EP) .................................. 20207693

(51) Int. Cl.
*H04W 4/38* (2018.01)
*H04W 4/12* (2009.01)
*H04W 4/40* (2018.01)

(52) U.S. Cl.
CPC ............... *H04W 4/38* (2018.02); *H04W 4/12* (2013.01); *H04W 4/40* (2018.02)

(58) Field of Classification Search
CPC ........... H04W 4/38; H04W 4/12; H04W 4/40; H04W 4/46; G08G 1/096716; G08G 1/096783; G08G 1/096741; G08G 1/096791; H04N 7/18
See application file for complete search history.

(56) References Cited

U.S. PATENT DOCUMENTS

| | | | |
|---|---|---|---|
| 2012/0105637 A1 | 5/2012 | Yousefi et al. | |
| 2013/0281140 A1 | 10/2013 | Rubin et al. | |
| 2017/0127246 A1* | 5/2017 | Zou ........................ | H04W 4/029 |
| 2017/0206426 A1* | 7/2017 | Schrier .................. | G06V 10/82 |
| 2018/0365909 A1* | 12/2018 | Cheng ...................... | H04Q 9/00 |
| 2020/0228946 A1* | 7/2020 | Hwang .................... | H04W 4/40 |
| 2020/0286308 A1 | 9/2020 | Kiefer et al. | |
| 2020/0374053 A1* | 11/2020 | Hwang .................... | H04W 4/40 |
| 2021/0039674 A1* | 2/2021 | Kim .................... | G01C 21/3819 |

OTHER PUBLICATIONS

Distance Measurement with a Stereo Camera—Kusworo Adi, Catur Edi Widodo; International Journal of Innovative Research in Advanced Engineering (IJIRAE) Issue 11, vol. 4 (Nov. 2017) ISSN: 2349-2163.*
What is Stereo Vision?—MathWorks; Sep. 15, 2013.*

(Continued)

*Primary Examiner* — Charles C Jiang
*Assistant Examiner* — Rachel Elizabeth Marks
(74) *Attorney, Agent, or Firm* — Michael Best & Friedrich LLP

(57) ABSTRACT

There is provided a method comprising: determining at least one V2X message (M) comprising at least one data container (DSC) comprising at least one environment image (I #1) representing a part (E #1) of an environment in at least one spatial dimension at one point in time; and wireless transmitting the at least one V2X message (M).

17 Claims, 6 Drawing Sheets

(56) References Cited

OTHER PUBLICATIONS

Guo et al., "V3: A vehicle-to-vehicle live video streaming architecture", Proceedings of the 3rd IEEE International Conference on Pervasive Computing and Communications, 2005, 10 pages.
Penrose, "Technical Report No. 526: Extending Lossless Image Compression", PhD dissertation, University of Cambridge, Jan. 2001, 149 pages.
Li et al., "Efficient coding method for stereo image pairs", SPIE Visual Communications and Image Processing, 1993, vol. 2094, pp. 1470-1476.

* cited by examiner

METHODS AND APPARATUSES FOR DETERMINING AND RECEIVING V2X MESSAGES

BACKGROUND OF THE INVENTION

The invention relates to determining and receiving V2X messages, in particular in an automotive environment.

SUMMARY OF THE INVENTION

According to a first aspect of the description, a method is provided that comprises: determining at least one V2X message comprising at least one data container comprising at least one environment image representing a part of an environment in at least one spatial dimension at one point in time; and wireless transmitting the at least one V2X message.

Sensor systems of a vehicle, for example, are subject to physical limitations like their fields of view, weather conditions and shadowing by further vehicles or roadside entities. By sharing the environment image via a V2X message, the recipients are able to mitigate the former limitations.

According to an advantageous example, the method comprises: receiving a request to share the environment image; and wherein the wireless transmitting of the at least one V2X message takes place in response to the received request.

Advantageously, the transmission of the environment image is triggered if a potential recipient requests it. Therefore, the transmission is demand-oriented and avoids flooding the radio channel with potentially unused data.

According to an advantageous example, the method comprises receiving or determining a trigger, for example an internal trigger, to omit or incorporate information associated with at least one sensor, from which the at least one environment image originates, as part of a further data container of the V2X message; wherein, if the trigger is received or determined, the at least one V2X message does not comprise the information associated with the sensor or comprises the information associated with the sensor.

Advantageously, the sensor information associated with the at least one sensor provides that the recipient is able to use and process the received at least one environment image in the dedicated form.

In an advantageous example, the method comprises: wireless receiving an acknowledgement, in particular in the sense of the trigger, in response to a transmitting of the information associated with the at least one sensor; and wireless transmitting at least one further V2X message omitting the information associated with the sensor. Advantageously, wireless transmission capacity is reduced by the omission of the information associated with the sensor.

According to another example, the method comprises: determining a change associated with the recipients, which are intended to receive the environment image; and determining the trigger in dependence on the determined change. Advantageously, at least the new group members will immediately receive the information associated with the sensor.

According to an advantageous example, the method comprises: determining an operating mode in dependence on a number of recipients associated with a reception of the at least one environment image; and determining the at least one environment image to be transmitted via the at least one V2X message based on the determined operating mode.

Advantageously, the number of recipients and the average generated data rate is indicative of a load of the radio channel caused by the transmission of the at least one environment image. Therefore, the radio channel load can be reduced if the number of recipients is considered.

For example, depending on the number of recipients, different pre-processing steps of the environment data can apply for reducing load in the wireless domain. Advantageously, the number of the potential recipients is indicative of the pre-processing, which reduces the size of the environment image transmitted over the air interface. Accordingly, a transmission efficiency gain is achieved by exploiting the information about the number of the potential or actual recipients.

According to an advantageous example, the method comprises determining a disparity information associated with the environment image; and wherein, in particular if the operating mode is a disparity mode, the at least one data container comprises the disparity information associated with the environment image.

The disparity information can be a disparity image or a stereo image. Advantageously, the disparity information helps each receiver to determine its own augmented vision of the environment. If a plurality of receivers is present, the transmission of the disparity information reduces calculation effort on the transmitter side. Furthermore, load on the used radio channel can be reduced as pre-calculated images for the individual receivers can be omitted.

According to another advantageous example, the method comprises: wirelessly receiving locations and associated poses of a plurality of individual recipients in the vicinity; determining the at least one environment image, which is associated with the plurality of individual recipients, in dependence on the locations and associated poses; and wherein, in particular if the operating mode is the disparity mode, the at least one data container comprises the at least one environment image, which is associated with the plurality of individual recipients. For example, the environment image can be preprocessed in order to be cropped to a smaller version of the whole environment image in order to reduce radio channel usage.

According to an advantageous example, the method comprises: wirelessly receiving at least one location and associated pose of an individual recipient in the vicinity; determining the at least one environment image, which is associated with the individual recipient, in dependence on the at least one location and associated pose; and wherein, in particular if the operating mode is an individual processing mode, the at least one data container comprises the at least one environment image, which is associated with the individual recipient.

Advantageously, local sensor data can be pre-processed according to the individual processing mode. The pre-processing allows to load-balance between the calculation entities involved in the wireless network. On the other hand, for example, the pre-processing based on the received pose of another apparatus allows cropping the environment image to the area of interest of the apparatus in the vicinity. Advantageously, transmission capacity is thus more efficiently used.

According to an advantageous example, the V2X message comprises an operating mode indicator indicating the determined operating mode. Advantageously, the recipients gain knowledge about how the environment image is pre-processed. Therefore, the recipients are enabled to process the received environment image based on the pre-processing indicator.

According to a second aspect of the description, an apparatus is provided that comprises: determining means to determine at least one V2X message comprising at least one data container comprising at least one environment image representing a part of an environment in at least one spatial dimension at one point in time; and wireless transmitting means to transmit the at least one V2X message.

Sensor systems of a vehicle, for example, are subject to physical limitations like their fields of view, weather conditions and shadowing by further vehicles or roadside entities. By sharing the environment image via a V2X message, the recipients are able to mitigate the former limitations.

According to an advantageous example, the apparatus comprises: receiving means to receive a request to share the environment image; and wherein the wireless transmitting of the at least one V2X message takes place in response to the received request.

Advantageously, the transmission of the environment image is triggered if a potential recipient requests it. Therefore, the transmission is demand-oriented and avoids flooding the radio channel with potentially unused data.

According to an advantageous example, the apparatus comprises: receiving means to receive or determining means to determine a trigger to omit or incorporate information associated with at least one sensor, from which the at least one environment image originates, as part of a further data container of the V2X message; wherein, if the trigger is received or determined, the at least one V2X message does not comprise the information associated with the sensor or comprises the information associated with the sensor.

Advantageously, the sensor information associated with the at least one sensor provides that the recipient is able to use and process the received at least one environment image in the dedicated form.

According to an advantageous example, the apparatus comprises: determining means to determine an operating mode in dependence on a number of recipients associated with a reception of the at least one environment image; and determining means to determine the at least one environment image to be transmitted via the at least one V2X message based on the determined operating mode.

Advantageously, the number of recipients is indicative of a load of the radio channel caused by the transmission of the at least one environment image. Therefore, the radio channel load can be reduced if the number of recipients is considered.

For example, depending on the number of recipients, different pre-processing steps of the environment data can apply for reducing load in the wireless domain. Advantageously, the number of the potential recipients is indicative of the pre-processing, which reduces the size of the environment image transmitted over the air interface. Accordingly, a transmission efficiency gain is achieved by exploiting the information about the number of the potential or actual recipients.

According to an advantageous example, the apparatus comprises: determining means to determine or receive a disparity information associated with the environment image; and wherein, in particular if the operating mode is a disparity mode, the at least one data container comprises the disparity information associated with the environment image.

The disparity information can be a disparity image or a stereo image. Advantageously, the disparity information helps each receiver to determine its own augmented vision of the environment. If a plurality of receivers is present, the transmission of the disparity information reduces calculation effort on the transmitter side. Furthermore, load on the used radio channel can be reduced as pre-calculated images for the individual receivers can be omitted.

According to an advantageous example, the apparatus comprises: receiving means to wirelessly receive at least one location and associated pose of an individual recipient in the vicinity; determining means to determine the at least one environment image, which is associated with the individual recipient, in dependence on the at least one location and associated pose; and wherein, in particular if the operating mode is an individual processing mode, the at least one data container comprises the at least one environment image, which is associated with the individual recipient.

Advantageously, local sensor data can be pre-processed according to the individual processing mode. The pre-processing allows to load-balance between the calculation entities involved in the wireless network. On the other hand, for example, the pre-processing based on the received pose of another apparatus allows cropping the environment image to the area of interest of the apparatus in the vicinity. Advantageously, transmission capacity is efficiently used.

According to a third aspect, a method is provided that comprises: wireless receiving at least one V2X message comprising at least one data container comprising at least one environment image representing a part of an environment in at least one spatial dimension at one point in time.

Sensor systems of a vehicle, for example, are subject to physical limitations like their fields of view, weather conditions and shadowing by further vehicles or roadside entities. By sharing the environment image via a V2X message, the recipients are able to mitigate the former limitations.

According to an advantageous example, the method comprises: transmitting a request to share the environment image; and wherein the wireless receiving of the at least one V2X message takes place in response to the transmitted request.

Advantageously, the transmission of the environment image is triggered if a potential recipient requests it. Therefore, the transmission is demand-oriented and avoids flooding the radio channel with potentially unused data.

According to an advantageous example, the method comprises: transmitting a trigger to incorporate or omit information associated with at least one sensor, from which the at least one environment image originates, as part of a further data container of the V2X message.

Advantageously, the sensor information associated with the at least one sensor provides that the recipient is able to use and process the received at least one environment image in the dedicated form.

According to an advantageous example, the method comprises: determining an operating mode associated with the processing of the at least one environment image based on the received V2X message; and processing the received at least one environment image based on the determined operating mode.

Advantageously, the recipient is able to adapt the processing of the environment image in line with the operating mode of the transmitter.

For example, if the operating mode is the disparity mode, the at least one data container comprises disparity information associated with the environment image.

For example, the method comprises wireless transmitting of a present location and associated pose of the apparatus, wherein, in particular if the operating mode is the disparity mode, the at least one data container comprises the at least one environment image, which is associated with a plurality of individual recipients. Therefore, the receiver processes the received environment image and selects the section, which is intended for the receiver.

For example, the method comprises wirelessly transmitting the location and associated pose; wherein, in particular if the operating mode is an individual processing mode, the at least one data container comprises the at least one environment image, which is associated with the individual recipient.

For example, the V2X message comprises an operating mode indicator indicating the determined operating mode. Advantageously, the recipients gain knowledge about how the environment image is pre-processed. Therefore, the recipients are enabled to process the received environment image based on the pre-processing indicator.

According to an example, the method comprises: wireless transmitting, in particular based on the determined operating mode, at least one present location and associated pose; wherein, in particular if the operating mode is an individual processing mode, the at least one data container comprises the at least one environment image, which is associated with the transmitted location and associated pose.

According to a fourth aspect, an apparatus is provided comprising: receiving means to wirelessly receive at least one V2X message comprising at least one data container comprising at least one environment image representing a part of an environment in at least one spatial dimension at one point in time.

Sensor systems of a vehicle, for example, are subject to physical limitations like their fields of view, weather conditions and shadowing by further vehicles or roadside entities. By sharing the environment image via a V2X message, the recipients are able to mitigate the former limitations.

According to an advantageous example, the apparatus comprises: transmitting means to transmit a request to share the environment image; and wherein the wireless receiving of the at least one V2X message takes place in response to the transmitted request.

Advantageously, the transmission of the environment image is triggered if a potential recipient requests it. Therefore, the transmission is demand-oriented and avoids flooding the radio channel with potentially unused data.

According to an advantageous example, the apparatus comprises: transmitting means to transmit a trigger to incorporate or omit information associated with at least one sensor, from which the at least one environment image originates, as part of a further data container of the V2X message.

Advantageously, the sensor information associated with the at least one sensor provides that the recipient is able to use and process the received at least one environment image in the dedicated form.

According to an advantageous example, the apparatus comprises: determining means to determine an operating mode associated with the processing of the at least one environment image based on the received V2X message; and processing means to process the received at least one environment image based on the determined operating mode.

According to a fifth aspect, a use of the method according to the first or third aspect or of an apparatus according to the second or fourth aspect is provided.

DETAILED DESCRIPTION

Figure 1:
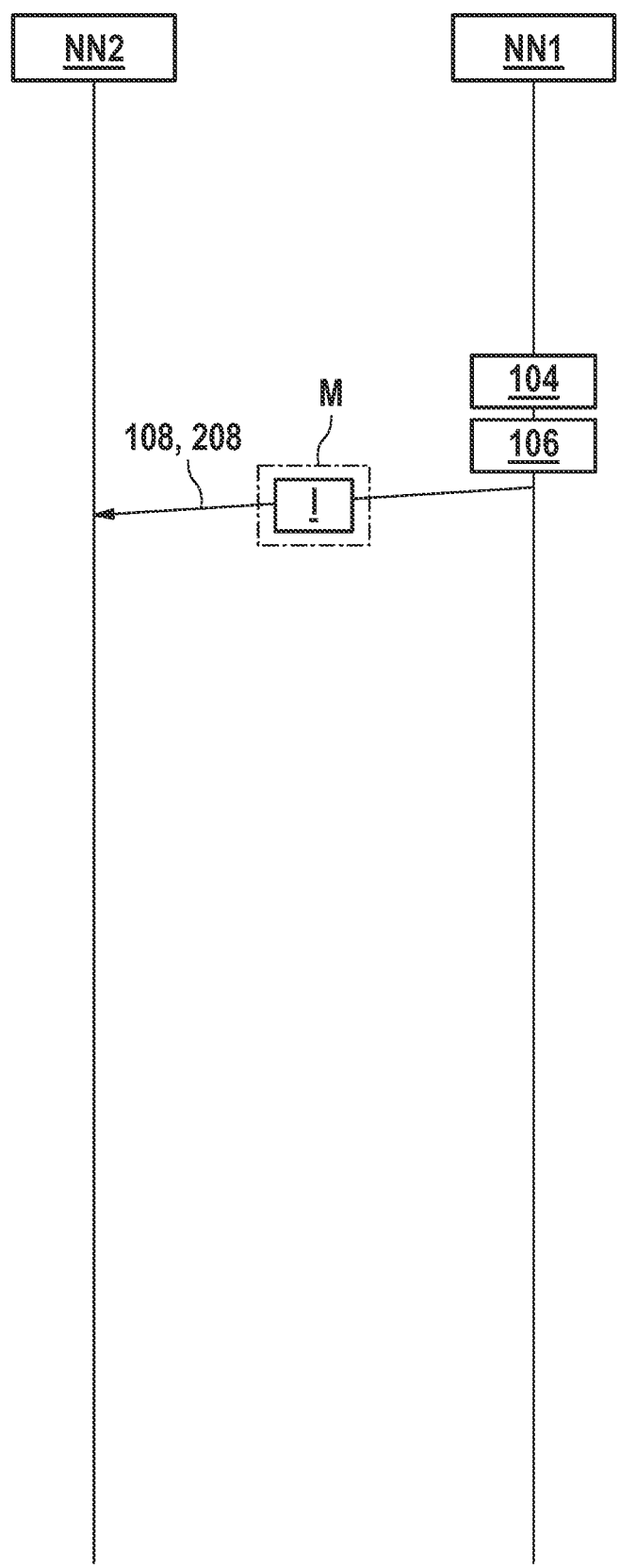
FIGS. 1 and 2 each depict a schematic sequence diagram.

FIG. 1 depicts a schematic sequence diagram. A radio communications network is made up of at least a first and second apparatus NN1, NN2. The apparatus NN1 obtains 104 at least one environmental image I from at least one sensor. The apparatus NN1 determines 106 at least one V2X message M, comprising at least one data container comprising at least one environment image I representing a part of an environment associated with the apparatus NN1 in at least one spatial dimension at one point in time. The apparatus NN1 wirelessly transmits 108 the at least one V2X message M.

The apparatus NN2 wirelessly receives 208 the at least one V2X message M, comprising the at least one data container comprising at least one environment image I representing the part of the environment associated with the apparatus NN1 in at least one spatial dimension at one point in time.

The environment image I represents the part of the environment which is detected by the at least one sensor. The environment image I represents the sensed part of the environment, for example surrounding the first apparatus NN1 or of an apparatus associated with the first apparatus NN1 in at least one spatial dimension, for example providing a pixel value in a horizontal or vertical direction. In another example, the environment image I represents the sensed part of the environment in two dimensions, for example providing a plurality of pixel values in horizontal and vertical direction. In another example, the environment image I represents the sensed part of the environment which is provided as a point cloud or other multidimensional representation.

Before determining and transmitting the V2X messages M, the apparatus NN1 checks, if new image data is available and incorporates this new image data into the next V2X message M to be transmitted.

Figure 2:
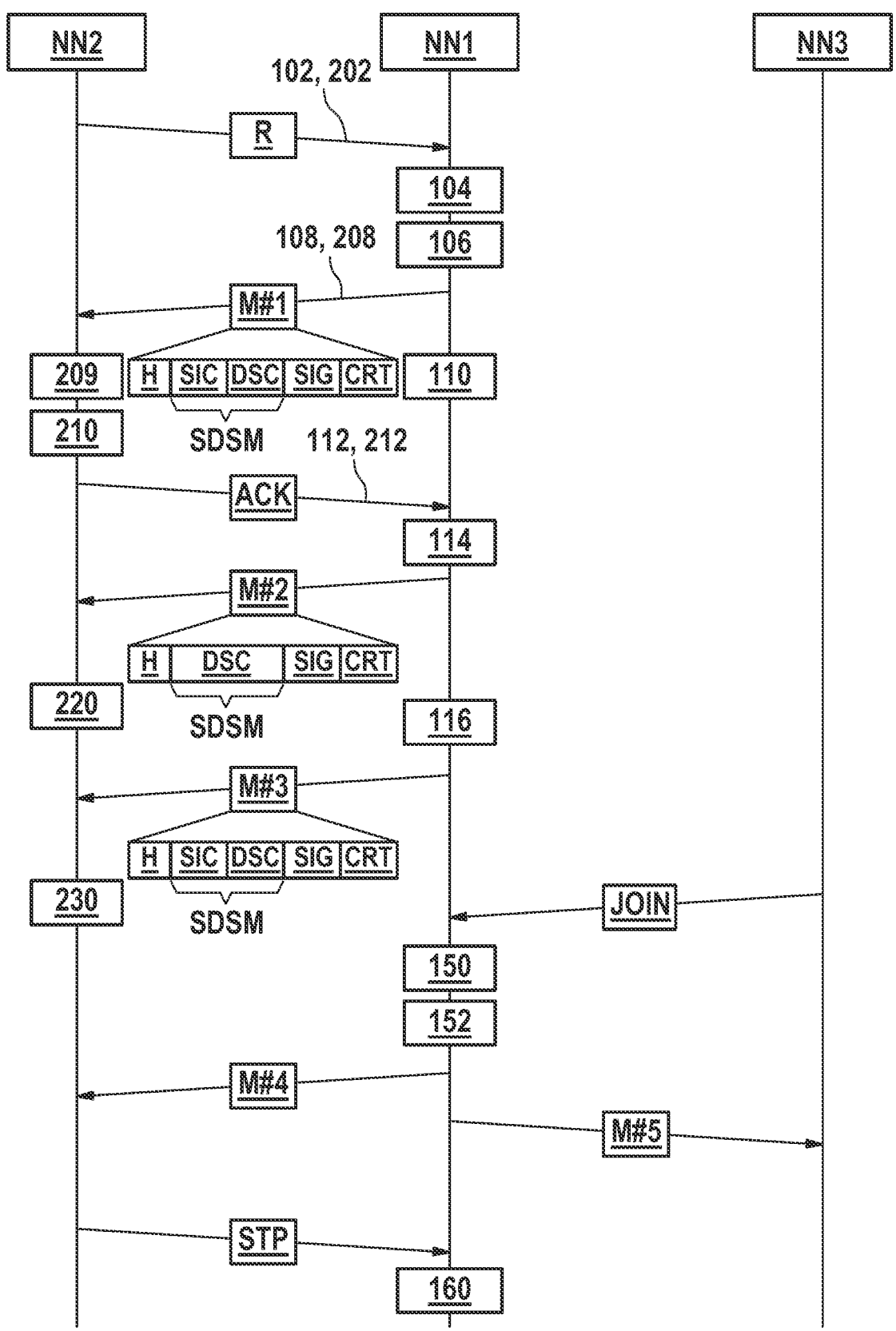

FIG. 2 depicts another sequence diagram. The apparatus NN2 transmits 202 a request R to share the environment image. The apparatus NN1 receives 102 the request R to share the environment image. The apparatus NN1 wirelessly transmits 108 the at least one V2X message M #1 in response to the received request R. The wireless receiving 208 of the at least one V2X message M #1 at the apparatus NN2 takes place in response to the transmitted request R.

After or before transmitting 108 the environment image, the apparatus NN1 may update 110 a local environment model based on the determined environment image.

The apparatus NN2 may update 210, 220, 230 a local environment model based on the received environment image.

The apparatus NN2 determines 209, before updating the local environment model, an operating mode associated with the processing of the at least one environment image based on the received V2X message M #1. The processing of the received at least one environment image I, I #1 and/or updating 210 is executed based on the determined operating mode.

The operating mode can be determined by the apparatus NN2 by detecting a presence of certain data like a disparity information. Moreover, the operating mode can be signaled explicitly to the apparatus NN2 by incorporating, by means of the apparatus NN1, an indicator into the V2X message, and by observing, by means of the apparatus NN2 the indicator of the V2X message. Therefore, the operating mode can be signaled implicitly or explicitly.

According to an example, the respective local environment model may be built from the fused information gathered by the vehicle's on-board sensors, such as radar, video cameras and LIDARs. This sensor fusion involves associating the measurements to tracks in the local environment model and filtering by algorithms such as Kalman or particle filters. To overcome physical limitations like their fields of view, weather conditions and shadowing, the local environment model is determined based on the received environment image from other entities.

The apparatus NN2 transmits 212 a trigger to omit information associated with the at least one sensor associated with apparatus NN1, from which the at least one environment image originates, as part of a further data container SIC of the V2X message M #2. The apparatus NN2 therefore signals that the information associated with the at least one sensor has been received.

In another example, not shown, the apparatus NN2 transmits a trigger to incorporate the information associated with at least one sensor, from which the at least one environment image originates, as part of the further data container SIC of the next V2X message.

The apparatus NN1 receives 112 the trigger ACK to omit information associated with at least one sensor, from which the at least one environment image originates, as part of the further data container SIC in the sense of a sensor information container of the V2X message M #2.

The apparatus NN1 determines 114 the next V2X message M #2. As the received trigger ACK represents an acknowledgement by the apparatus NN2 that the information associated with the sensor was correctly received by the apparatus NN2, the apparatus NN1 will omit this information in V2X messages starting with V2X message M #2.

In another example, the apparatus NN1 determines 116 a trigger to incorporate information associated with the at least one sensor, from which the at least one environment image originates, as part of the further data container SIC of the V2X message M #3. For example, a change of a sensor state or a change in the recipients group may cause the determination of the trigger to incorporate the information associated with the at least one sensor.

If the trigger is received or determined, the at least one V2X message M, M #1, M #2, M #3, M #4, M #5 does not comprise the information associated with the sensor S1 or comprises the information associated with the at least one sensor.

According to an example, the trigger to incorporate the information associated with the sensor in a subsequent V2X message M #3 is determined 116 in dependence on the sensor state. For example, if a quality of the sensor data is expected to be deteriorated, the information associated with the sensor is transmitted. In addition, if the sensor data is expected to be in a good quality state, the information associated with the sensor is transmitted.

For example, the sensor state comprises at least one of the following: a quality indicator indicating a quality of the environment image; a sensor condition; an accuracy indicator indicating the accuracy of the environment image. A change in the sensor state represents a determination of the trigger to incorporate the information associated with the sensor.

Before determining 150 the operating mode, the apparatus NN1 receives a request JOIN from a further apparatus NN3, indicating that the further apparatus NN3 wishes that the apparatus NN1 shares the environment image in order to receive the at least one environment image from apparatus NN1.

In the present case, two apparatuses NN2 and NN3 wish to receive the environment image from apparatus NN1. Therefore, the operating mode 150 is determined for attending the two recipients in form of the apparatuses NN2 and NN3. Accordingly, the apparatus NN1 determines 152 the at least one environment image to be transmitted via the V2X messages M #4 and/or M #5 based on the determined operating mode. In the present case, two separate V2X message M #4 and M #5 may be transmitted or the two different environment images I may be added to the data stream container DSC with two different data streams into one message and transmitted to NN2 and NN3 at the same time. The determination of the environment images for the two recipients is based on the respective position and pose of the apparatuses NN2, NN3. The reception of the respective position and pose of the apparatuses is not shown in the drawing and happens just before the determination 152. In another operating mode, only one V2X message has to be transmitted to all recipients. More details are provided by FIG. 3 and its description.

Upon the reception of a stop message STP, the apparatus NN1 stops 160 transmitting V2X messages comprising the environment image to the recipients requesting the stop. Other recipients may still receive messages. In case no more potential beneficiaries are known to the transmitting apparatus NN1, the apparatus NN1 may stop the transmission on its own.

According to an example not shown in FIG. 2, the apparatus NN1 transmits, before establishing a communication like that shown in FIG. 2, a V2X message comprising the further data container SIC but not the data container DSC. This V2X message allows a discovery of the apparatus NN1 and the sensors at the premises of the apparatus NN1 being able to provide the environment image.

Figure 3:
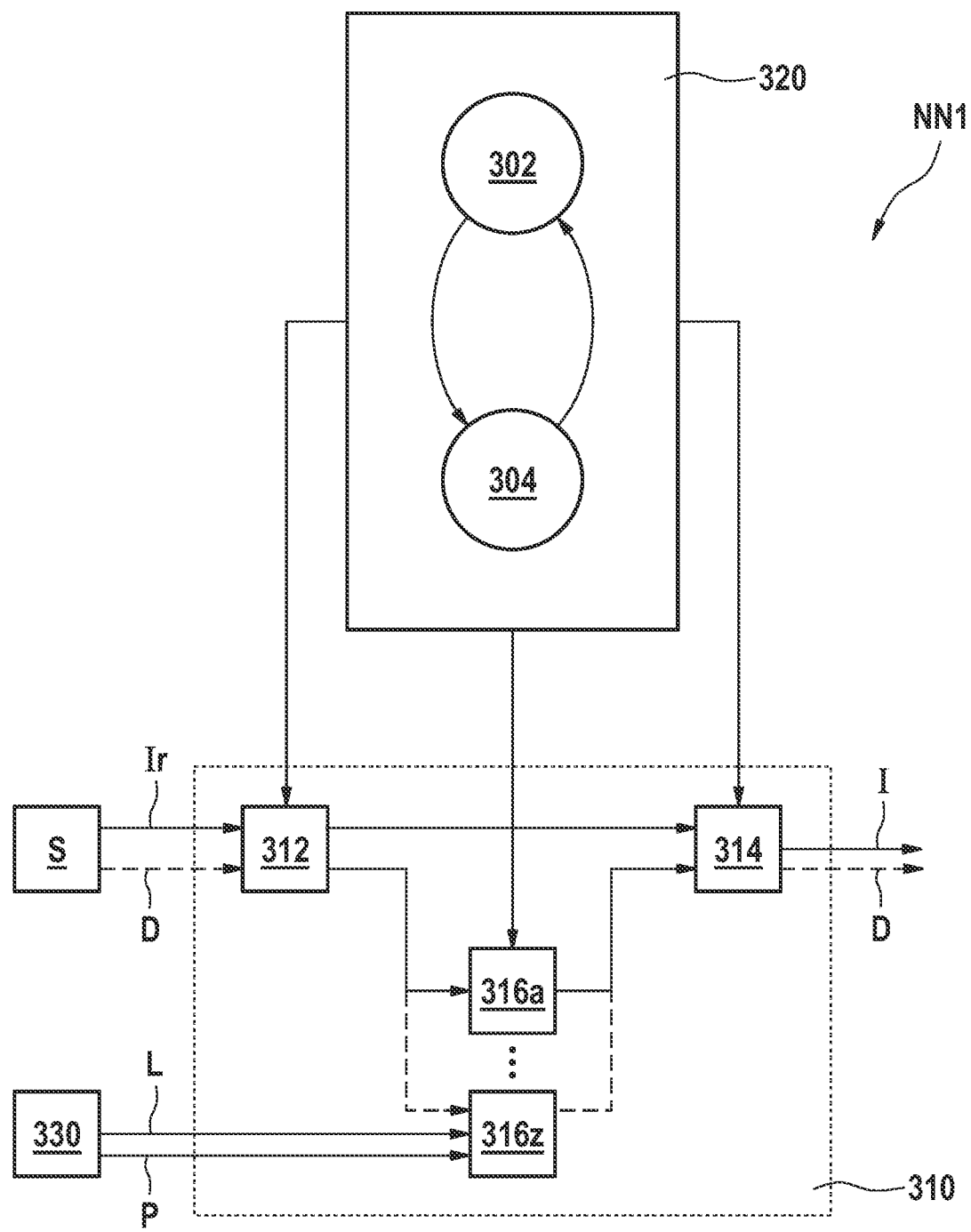
FIG. 3 depicts a schematic block diagram.

FIG. 3 depicts a schematic block diagram of the apparatus NN1. A sensor S comprises one or more single sensor entities, which can be even distributed at the premises of the entity the apparatus NN1 is connected to. The sensor S determines raw images Ir and transmits them to a preprocessing entity 310. An application manager 320 is configured to select one of a plurality of operating states 302, 304 to be the active one. In dependence on the selected one of the operating states, the application manager 320 instructs preprocessing units 312, 314, 316a-z to preprocess the raw images Ir in order to determine the at least one environment image I to be included into the at least one V2X message. The preprocessing units 312 and 314 represent switches passing and receiving the ingress data like the raw image Ir to and from the corresponding preprocessing unit 316a-z depending on the determined operating mode.

The apparatus NN1 determines or receives from the at least one sensor a disparity information D associated with the environment image I. If the operating mode is a disparity mode 302, the at least one data container DSC comprises the disparity information D associated with the environment image I. According to an example, the environment image I and the associated disparity information D are not preprocessed by the preprocessing unit 310.

In an example, the apparatus NN1 wirelessly receives 330 at least one location L and associated pose P of an individual recipient in the vicinity of the apparatus NN1. The apparatus NN1 determines 316z the at least one environment image I, which is associated with the individual recipient, in dependence on the at least one location L and associated pose P.

If the operating mode is the individual processing mode 304, the at least one data container DSC comprises the at least one environment image I, which is associated with the individual recipient. Therefore, a plurality of environment images I are determined for the respective recipient.

Figure 4:
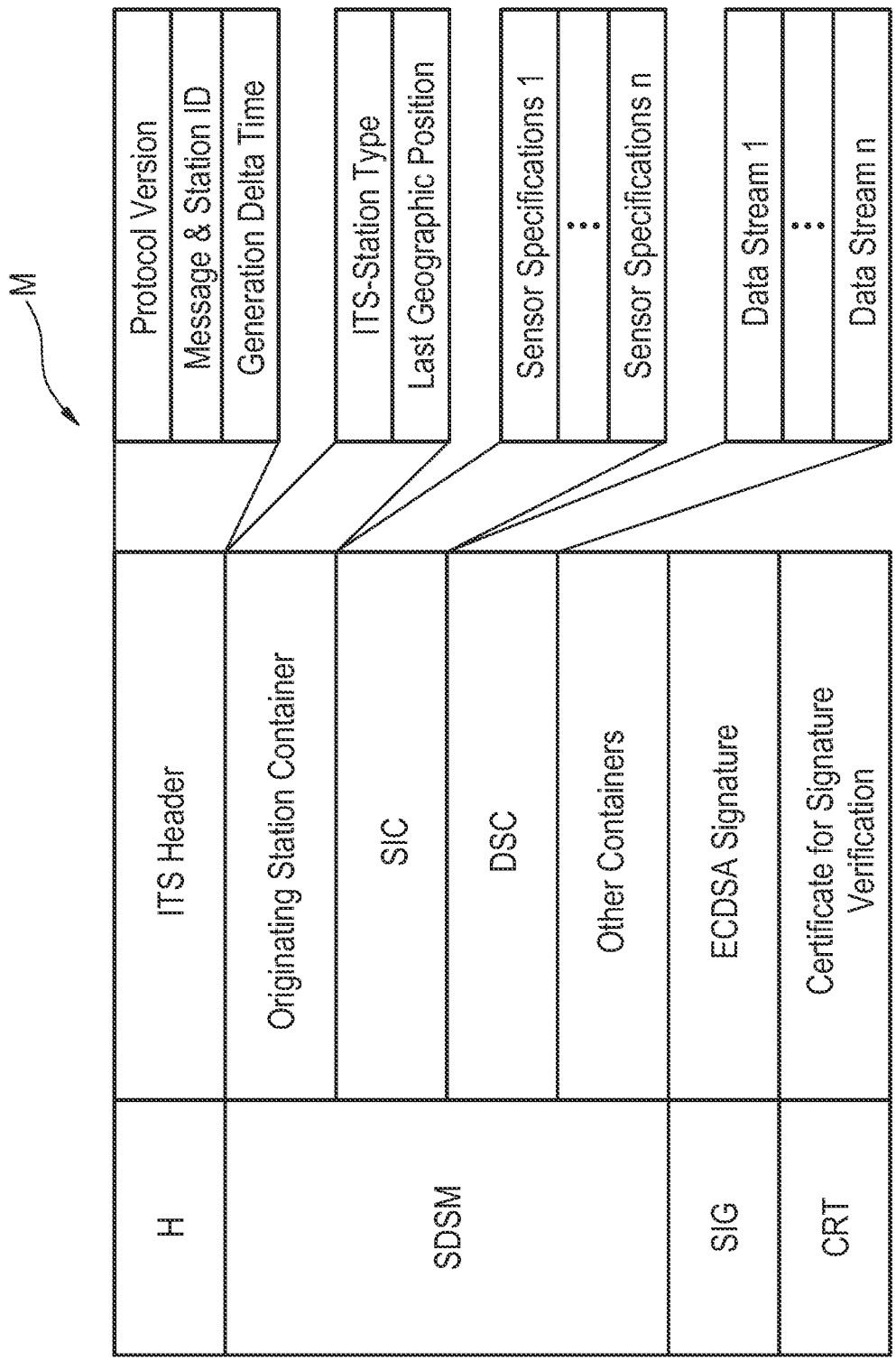
FIG. 4 depicts a schematic V2X message format.

FIG. 4 depicts an exemplary structure of a V2X message M. The header H may comprise an ITS header with protocol version, message and station identifier and the generation delta time. The signature SIG comprises, for example, an ECDSA signature (Elliptic Curve Digital Signature Algorithm). The certificate CRT comprises, for example a certificate for signature verification. One advantage of the proposed V2X service message format is the possibility to share data steams (e.g. a video stream) among traffic participants gathered on-board. The SDSM (SDSM: Sensor Data Stream Message) may include data gathered by the respective sensors and transmit it immediately (if the communication channel allows it). The start of transmission or service can be event-based (either by request or by the will of the transmitter).

The proposed message format of the SDSM allows to share sensor data (cameras or others) and can make use e.g. of the existing V2X protocol stack with the proposed protocol being located at the facility layer. This makes it compatible with all state-of-the-art medium access technologies, such as the Wi-Fi-based IEEE 802.11p and IEEE 802.11bd, the cellular-based LTE/4G-V2X (Mode 3 and 4) and NR/5G-V2X among others.

The containers SIC and DSC are different. While the SIC contains sensor specifications such as their locations relative to the last transmitted geographic position of the originating station container and other calibration data and may thus to be included only once at the start of the communication (for each potential receiver) or in case the SIC is subject to a relevant change, the DSC will form the core of each SDSM being transmitted.

The SDSM comprises an origination station container, the container DSC and may comprise the container SIC and further containers.

The sensor information container SIC lists information for individual sensor(s) which are mounted to a vehicle like a car, ship, drone or to an infrastructure entity like a roadside unit to detect surrounding objects. The container SIC provides descriptive information about the sensory properties of the at least one sensor. Every described sensor is provided with an identifier, which is in turn utilized in data stream container DSC to relate the environment image to a particular sensor.

Additionally, the sensor information in the SIC is accompanied by a sensor categorization to indicate the type of the perception system. This can be a specific sensor type such as a radar or LIDAR sensor up to a system providing fused object information from multiple sensors. As different sensor types may be attached to an ITS-S, e.g. radar, LIDAR, combined sensor fusion system and alike, the container SIC provides different possibilities for describing the properties of a sensor-system.

For example, two types of descriptions are differentiated: sensors, which are mounted to moving station, such as vehicles, and sensors, which are stationary, e.g. because they are mounted to a RSU (roadside unit).

Either variant can be used to describe the sensory capabilities of the disseminating entity. This can be the actual parameters of a perception-system, i.e. its actual perception range, or the applicable perception area of the perception system, i.e. the area in which environment images are determined by the sensor.

By providing information associated with the sensor as part of the further container SIC of the V2X message, receivers are given the opportunity to derive the surrounding areas, which are currently covered by at least one perception system.

A type description of the sensor provides information about sensors mounted to vehicles or infrastructure entities. The properties of these perception systems are defined by providing the mounting position of a sensor with respect to a specific reference point on the vehicle or infrastructure entity. The range and horizontal as well as optional vertical opening angles are provided to describe the sensor's frustum via the SIC. In case a sensor has multiple detection areas, such as a combined long- and mid-range sensor, multiple perception areas for a sensor can be encoded. The provided offset from a reference point on the vehicle serves as the origin of a sensor-specific local coordinate system.

The position provided by the offset from a reference point on the vehicle or infrastructure entity also serves as the origin of a sensor-specific local coordinate system. Being provided with the sensor position and the opening angles, the receivers of the environment image via the DSC can determine the sensor measurement area by projecting the area defined by the opening angles on the ground.

For stationary sensors, similar information associated with the sensor for describing the perception system's perceived area are provided via the SIC. This is particularly useful if the perception area is generated by combining several separate systems, which however act as one sensor.

Figure 5:
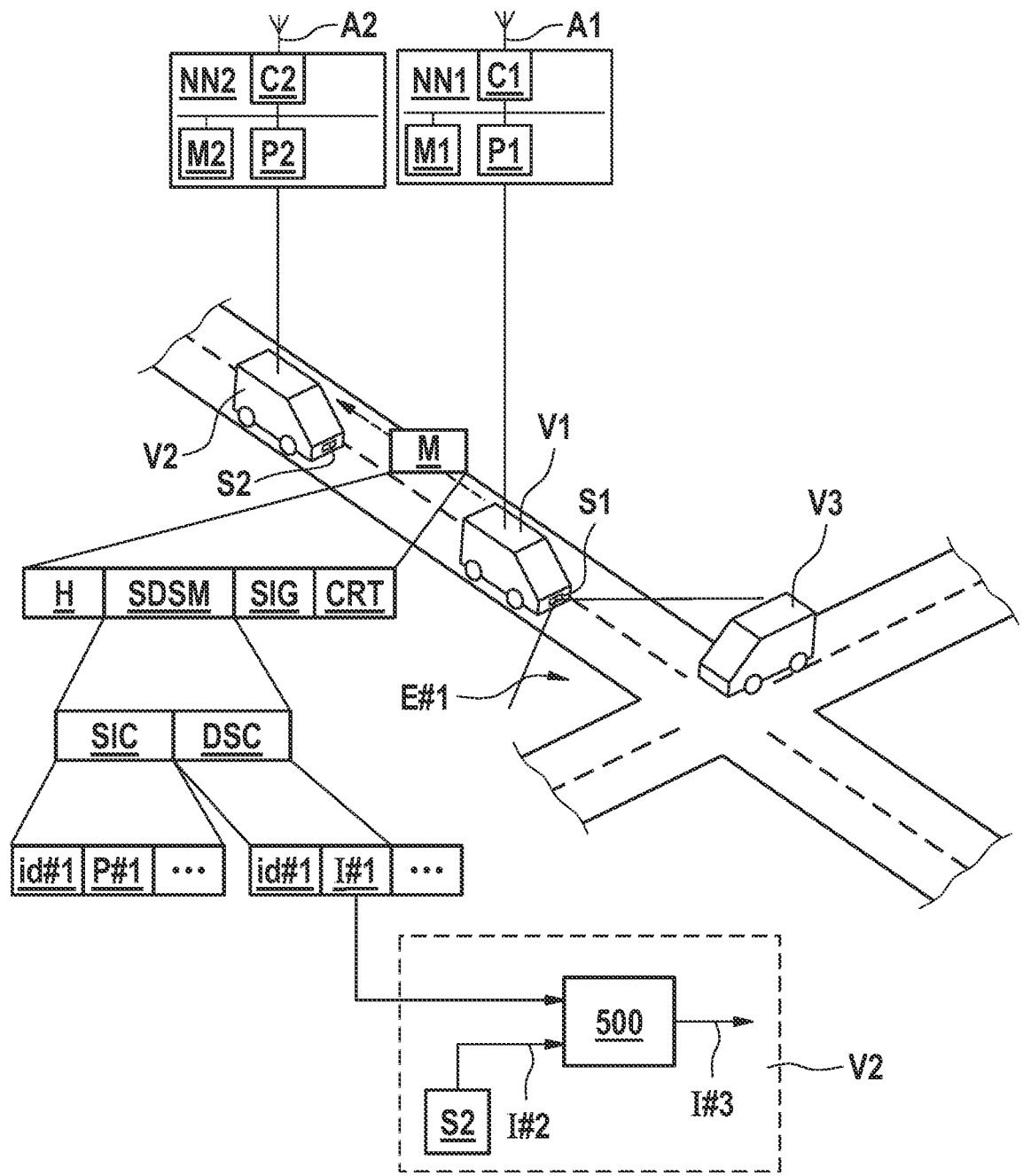
FIG. 5 depicts an exemplary situation on a street.

FIG. 5 depicts an exemplary situation on a street crossing. Vehicle V1, V2 comprises the apparatus NN1, NN2, which can be termed wireless network node. The apparatus NN1, NN2 comprises a processor P1, P2, a memory M1, M2, a communication module C1, C2, and an antenna A1, A2. A computer program is stored on the memory M1, M2 and configured, together with the processor P1, P2, the communication module C1, C2, and the antenna A1, A2, to cause the apparatus NN1, NN2 to conduct the measures of this description.

In case of the first vehicle V1 driving in front of the second vehicle V2, the second vehicle V2 receives the environment image I #1 of a front sensor S1 of the first vehicle V1. In another example, the combined environment image I #3 or the received environment image I #2 are used to detect objects like a third vehicle V3 at the premises of the second vehicle. In another example, the image I #3 is displayed to the driver of the second vehicle V2 via a display apparatus (so called See-Through application).

Therefore, the driver of the vehicle V2 is able to detect the third vehicle V3 in front of vehicle V1 although the first vehicle V1 obstructs the view to the third vehicle V3. By sharing the video stream obtained from its front camera, vehicle V1 can mitigate this lack, significantly increasing the traffic safety and efficiency. Therefore, raw or preprocessed sensor data in the sense of the environment image is transmitted in a V2V fashion, with an inter-sensor format that can be used for a large variety of use cases.

The information P #1 associated with the sensor S1 is provided via the container SIC.

The SDSM can be requested by a traffic participant from one or more others e.g. by means of a flag within the optional part of the Cooperative Awareness Message (CAM) in Europe or its North American equivalent, the Basic Safety Message (BSM) or any other message type. It could also be requested by other methods or just be shared because the transmitting vehicle decides to on its own (based on external or internal factors). In another example, a continuous transmission of SDSM is conceivable if the communication technologies allow it. In the same way a capable transmitter can share or broadcast the information (e.g. via an extended CAM or BSM) that it is ready to transmit SDSM messages without a request. As the container SIC is transmitted only if needed, it is possible to not only request the service to receive the SIC data but also to have other flags apart from the initial service request (contained in existing messages such as CAM/BSM or in new or dedicated messages) acknowledging the successful reception of the SIC (and thus permitting the transmitting vehicle to omit it in the following SDSMs) or informing the end of need for the service by the traffic participant. Once vehicles have unlinked, the transmitting vehicle can stop transmitting SDSMs until the next request is received.

The addressee of the request can be defined either by an ID (e.g. StationID which is part of the ITS Header common to all V2X messages) of the possible transmitter, by a geographic region or other identifiers. It is possible to receive the ID of a potential transmitter vehicle from a V2X message.

The possible applications of the SDSM go far beyond the presented see through case of FIG. 5. Other applications comprise the sharing of camera, radar or LIDAR data in real time to allow image level fusion by the receiving vehicle V2, increasing their perception capabilities, or a cooperative simultaneous localization and mapping (SLAM).

As already hinted in the see through use case, the container DSC may not only contain raw measurement data. Preprocessed data (e.g. that includes a synthetic image where the perspective is adapted to the rear vehicle in the see-through use case) can be included (see FIG. 3). For the creation of this synthetic image the beneficiary may sometimes be required to share information (e.g. its pose, consisting of position & orientation), with the vehicle offering the service. This adaption may further either be requested by the recipients like vehicle V2 or directly applied by the transmitter, depending on the application and the scenario. For example, it may make sense in the described see through scenario with only one transmitter and one receiver. However, with more than one receiver it may be preferable to transmit the unmodified raw data to reduce the need for higher data streams and distribute the computation efforts. For this method the front vehicle V1 does not need information about the poses from the vehicles behind, but the front vehicle V1 transmits not only the video stream of its camera but also the disparity image (created e.g. by stereo camera or a time of flight (TOF) sensor) or the stereo image. In both methods the receiving vehicle V2 is able to display the see-through application to its driver.

Of course, the applications of the proposed scheme are not limited to vehicles or other road users. A camera or any other type of sensor located on an urban junction-arm or a drone may be able to extend the vision of passing traffic participants as well by allowing them to "see-through" certain infrastructure such as buildings or vegetation.

Applications other than ST (See-Through) could be the sharing of landmarks, image features or point-clouds e.g. by a truck driving on the right lane next to a vehicle. The ego vehicle can help to make a simultaneous localization and mapping (SLAM) more robust against the shadowing of the truck.

Figure 6:
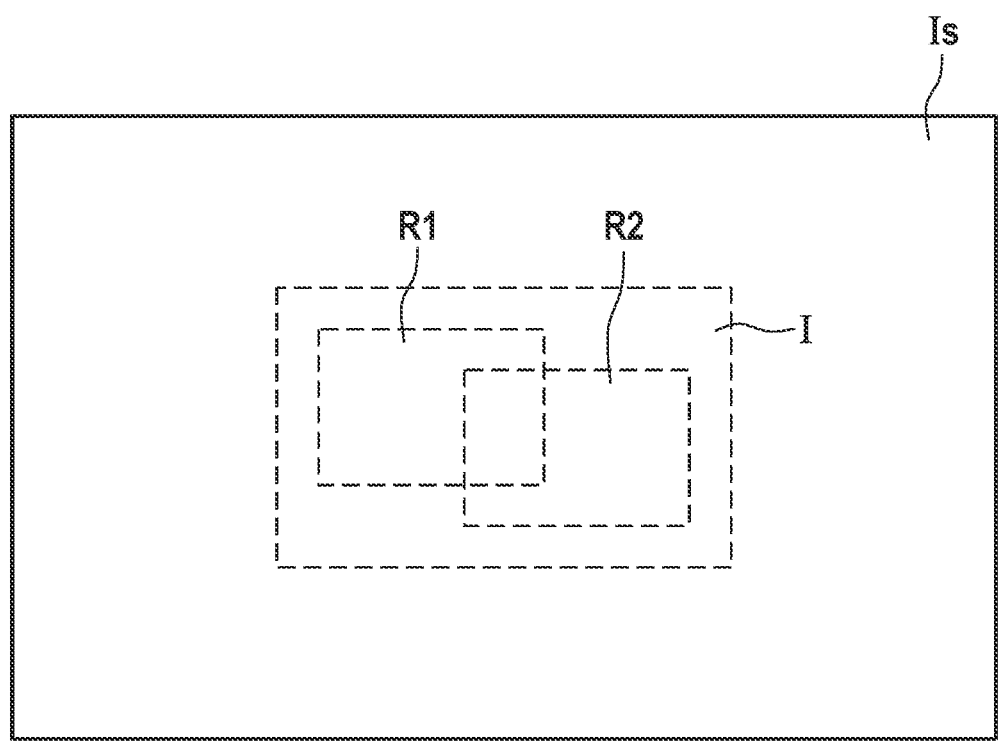
FIG. 6 schematically depicts an image crop method.

FIG. 6 depicts a schematic crop operation. The first apparatus wirelessly receives wirelessly locations and associated poses of a plurality of individual recipients in the vicinity. A region of interest R1 for a first recipient in the environment image Is provided by the sensor is different from a region of interest R2 for a second recipient. The regions R1, R2 are determined by the first apparatus in dependence on the received locations and associated poses. The at least one environment image I, which is associated with the plurality of individual recipients, is therefore determined in dependence on the locations and associated poses, and is smaller than the provided environment image Is. In particular if the operating mode is the disparity mode, then the at least one data container comprises the at least one cropped environment image I, which is associated with the plurality of individual recipients. Therefore, the applied preprocessing is a crop operation applied to the environment image Is in order to determine the environment image I for transmission.

The invention claimed is:

1. A method for transmitting vehicle-to-everything (V2X) messages in a radio communications network, the method comprising:
determining an operating mode based on a number of vehicles that are recipients of an at least one environment image, wherein the operating mode is an individual processing mode when there is an individual recipient vehicle;
wirelessly receiving at least one location and associated pose of the individual recipient vehicle;
determining, via an electronic processor of an apparatus, at least one V2X message that includes at least one data container that has the at least one environment image representing a part of an environment in at least one spatial dimension at one point in time, wherein, when the determined operating mode is the individual processing mode, the at least one environment image is cropped based on the at least one location and associated pose of the individual recipient vehicle; and
wirelessly transmitting, via the apparatus, the at least one V2X message to the individual recipient vehicle.

2. The method according to claim 1 further comprising:
receiving a request to share the environment image; and
wherein the wireless transmitting of the at least one V2X message takes place in response to the received request.

3. The method according to claim 1 further comprising:
receiving or determining a trigger to omit or incorporate information associated with at least one sensor, from which the at least one environment image originates, as part of a further data container of the V2X message;
wherein, if the trigger is received or determined, the at least one V2X message does not comprise the information associated with the sensor or comprises the information associated with the sensor.

4. The method according to claim 1 further comprising:
determining a disparity information associated with the environment image; and
wherein, when the determined operating mode is a disparity mode, the at least one data container comprises the disparity information associated with the environment image.

5. The method according to claim 1, wherein the associated pose of the individual recipient includes a position and an orientation of the individual recipient.

6. A radio apparatus configured to:
determine an operating mode based on a number of vehicles that are recipients of an at least one environment image, wherein the operating mode is an individual processing mode when there is an individual recipient vehicle;
wirelessly receive at least one location and associated pose of the individual recipient vehicle;

determine at least one vehicle-to-everything (V2X) message having at least one data container that has the at least one environment image representing a part of an environment in at least one spatial dimension at one point in time, wherein, when the determined operating mode is the individual processing mode, the at least one environment image is cropped based on the at least one location and associated pose of the individual recipient vehicle; and wirelessly transmit the at least one V2X message to the individual recipient vehicle.

7. The radio apparatus according to claim 6 further configured to:
receive a request to share the environment image; and
wirelessly transmit the at least one V2X message takes place in response to the received request.

8. The radio apparatus according to claim 6 further configured to:
receive or determine a trigger to omit or incorporate information associated with at least one sensor, from which the at least one environment image originates, as part of a further data container of the V2X message;
wherein, if the trigger is received or determined, the at least one V2X message does not comprise the information associated with the sensor or comprises the information associated with the sensor.

9. The radio apparatus according to claim 6 further configured to:
determine or receive a disparity information associated with the environment image; and
wherein, when the determined operating mode is a disparity mode, the at least one data container comprises the disparity information associated with the environment image.

10. A method for receiving vehicle-to-everything (V2X) messages in a radio communications network, the method comprising:
wirelessly receiving, via an antenna of an apparatus included in a recipient vehicle, at least one V2X message comprising at least one data container comprising at least one environment image representing a part of an environment in at least one spatial dimension at one point in time;
determining an operating mode associated with the processing of the at least one environment image based on the received V2X message, wherein, when the recipient vehicle is the only recipient of the at least one environment image, the operating mode associated with processing the at least one environment image is an individual processing mode and the at least one environment image is cropped based on at least one location and associated pose of the recipient vehicle.

11. The method according to claim 10 further comprising:
transmitting a request to share the environment image; and
wherein the wireless receiving of the at least one V2X message takes place in response to the transmitted request.

12. The method according to claim 10 further comprising:
transmitting a trigger to incorporate or omit information associated with at least one sensor, from which the at least one environment image originates, as part of a further data container of the V2X message.

13. The method according to claim 10 further comprising:
processing the received at least one environment image based on the operating mode.

14. A radio apparatus configured to:
wirelessly receive at least one vehicle-to-everything (V2X) message comprising at least one data container comprising at least one environment image representing a part of an environment in at least one spatial dimension at one point in time, wherein, the radio apparatus is included in a recipient vehicle and,
determine an operating mode associated with the processing of the at least one environment image based on the received V2X message, when the recipient vehicle is the only recipient of the at least one environment image, the operating mode associated with processing the at least one environment image is an individual processing mode and the at least one environment image is cropped based on at least one location and associated pose of the recipient vehicle.

15. The radio apparatus according to claim 14 further configured to:
transmit a request to share the environment image; and
wherein the wireless receiving of the at least one V2X message takes place in response to the transmitted request.

16. The radio apparatus according to claim 14 further configured to:
transmit a trigger to incorporate or omit information associated with at least one sensor, from which the at least one environment image originates, as part of a further data container of the V2X message.

17. The apparatus according to claim 14 configured to:
process the received at least one environment image based on the operating mode.

* * * * *